(12) United States Patent
Söderberg et al.

(10) Patent No.: US 9,424,258 B2
(45) Date of Patent: Aug. 23, 2016

(54) ASSIGNING TAGS TO MEDIA FILES

(75) Inventors: Joakim Söderberg, Solna (SE); Che Zhong, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 207 days.

(21) Appl. No.: 14/342,437

(22) PCT Filed: Sep. 8, 2011

(86) PCT No.: PCT/SE2011/051088
§ 371 (c)(1),
(2), (4) Date: Mar. 3, 2014

(87) PCT Pub. No.: WO2013/036181
PCT Pub. Date: Mar. 14, 2013

(65) Prior Publication Data
US 2014/0222755 A1  Aug. 7, 2014

(51) Int. Cl.
*G06F 7/04* (2006.01)
*G06F 17/30* (2006.01)

(52) U.S. Cl.
CPC ..... *G06F 17/30038* (2013.01); *G06F 17/3002* (2013.01); *G06F 17/30247* (2013.01); *G06F 17/30265* (2013.01); *G06F 17/30817* (2013.01)

(58) Field of Classification Search
CPC .................. G06F 17/30247; G06F 17/30265; G06F 17/30256; G06F 17/3002; G06F 17/30038; G06F 17/30784; G06F 17/30268; G06F 17/30817; G06F 17/30
See application file for complete search history.

(56) References Cited

U.S. PATENT DOCUMENTS

| 8,642,872 B2 * | 2/2014 | Lu ........................ G10H 1/0058 84/602 |
| 2004/0174434 A1 | 9/2004 | Walker et al. |
| 2009/0074329 A1 | 3/2009 | Chou et al. |
| 2011/0029561 A1 * | 2/2011 | Slaney .............. G06F 17/30247 707/772 |

FOREIGN PATENT DOCUMENTS

| WO | 2010048428 A2 | 4/2010 |
| WO | 2011084092 A1 | 7/2011 |

OTHER PUBLICATIONS

Naaman, M., et al., "ZoneTag's Collaborative Tag Suggestions: What is This Person Doing in My Phone?" IEEE Multimedia. IEEE Computer Society. Sep. 12, 2008. pp. 34-40. vol. 15. Issue 3.

* cited by examiner

*Primary Examiner* — Bruce Moser
(74) *Attorney, Agent, or Firm* — Patent Portfolio Builders, PLLC

(57) ABSTRACT

There is described a device and method for assigning a tag to a media file associated with metadata describing features of the media file. The metadata is converted into a query feature vector associated with the media file. A weighted distance is calculated between the query vector and each of a plurality of tag feature vectors, where each tag feature vector is included in a tag instance stored in a database, each tag instance further comprising a tag and a weight vector. The weighted distance is determined by comparing each feature of the query vector with the corresponding feature in the tag feature vector to obtain an initial distance value for that feature, modifying the initial distance value by a weight for that feature obtained from the weight vector in the tag instance to obtain a comparison value for that feature, and combining the comparison values of all of the features to obtain the weighted distance. Those tag instances whose tag feature vectors have the smallest weighted distance from the query vector are selected. The user chooses one or more of the selected tags, which are then associated with the media file. The weight for each feature in the weight vectors in the tag instances selected by the tag selection unit is updated on the basis of whether or not the tag in each tag instance was chosen by the user, and the distance between the feature of the tag feature vector and the corresponding feature in the query vector.

18 Claims, 2 Drawing Sheets

ASSIGNING TAGS TO MEDIA FILES

TECHNICAL FIELD

The present invention relates to learning the relevance of features in deciding how to assign tags to media files such as pictures or video.

BACKGROUND

The widespread use of digital cameras and camera phones, combined with the portability and vast storage capabilities offered by this type of media capture device, makes it possible for people to capture and store as many photographs as they want at any time and in any place. The size of image collections has increased dramatically as a result, and organizing digital photographs is becoming an increasingly difficult task. Therefore, an intelligent and effective image classification method is desirable. One approach involves photo annotation and tagging. However, the manual addition of tags is still a cumbersome and time-consuming task for users.

Efforts have therefore been made to provide automatic tagging suggestions by identifying the tags applied to similar photographs or videos. However, existing approaches do not include the user in the loop. There is no successful solution that integrates user-feedback to improve the efficiency of automatic tag generation.

SUMMARY

The object of the present invention is to address the above problems.

In accordance with one aspect of the present invention there is provided a device for assigning a tag to a media file associated with metadata describing features of the media file. The system comprises a vector conversion unit for converting the metadata into a query feature vector associated with the media file. A database contains tag instances, each tag instance comprising a tag, a tag feature vector and a weight vector. A distance calculation unit is configured to calculate a weighted distance between the query vector and the tag feature vector of each tag instance in the database. The weighted distance is determined by comparing each feature of the query vector with the corresponding feature in the tag feature vector to obtain an initial distance value for that feature, modifying the initial distance value by a weight for that feature obtained from the weight vector in the tag instance to obtain a comparison value for that feature, and combining the comparison values of all of the features. A tag selection unit is configured to select those tag instances whose tag feature vectors have the smallest weighted distance from the query vector. A user communication unit is configured to enable the tags from the selected tag instances to be presented to a user so that the user can choose one or more tags from those presented to him. A tag association unit is configured to associate the chosen tags with the media file. A weight updating unit is configured to update the weight for each feature in the weight vectors in the tag instances selected by the tag selection unit on the basis of whether or not the tag in each tag instance was chosen by the user, and the distance between the feature of the tag feature vector and the corresponding feature in the query vector.

The weight updating unit may be configured to improve the weight of a feature in the weight vector of a tag instance if that tag instance was chosen by the user and the initial distance value indicates that the feature in the query vector and feature vector are similar, or that tag instance was not chosen by the user and the initial distance value indicates that the feature in the query vector and feature vector are different. The weight updating unit may be configured to degrade the weight of a feature in the weight vector of a tag instance if that tag instance was chosen by the user and the initial distance value indicates that the feature in the query vector and feature vector are different, or that tag instance was not chosen by the user and the initial distance value indicates that the feature in the query vector and feature vector are similar.

The weighting may be configured such that the weight of a feature in a weight vector of a tag instance is higher if user feedback has indicated that the feature is important for that tag than if user feedback has indicated that the feature is unimportant for that tag. If this is the case, improving the weight comprises increasing the weight, and degrading the weight comprises decreasing the weight. This may be carried out using a moving average.

The distance calculation unit may be configured so that obtaining the initial distance value for each feature is achieved by assigning to the initial distance value a small fraction of 1 (e.g. 0.1) if the feature is the same in the query vector and the tag feature vector, and a large fraction of 1 (e.g. 0.9) if the feature is different in the two vectors.

The weight vector in each tag instance may comprise a set of weight values $w_i$ each corresponding to a feature i in the tag weight vector. The distance calculation unit may be configured to obtain the weight by which the initial distance value for each feature is to be modified on the basis that weight=$w_i$ if the initial distance is small; and
weight=$1-w_i$ if the initial distance is large.

The weight updating unit may be configured to improve a weight $w_k$ using the formula $w_k(t+1)=(w_k(t)\cdot n+0.9)/(n+1)$ and degrade a weight using the formula $w_k(t+1)=(w_k(t)\cdot n+0.1)/(n+1)$ where n is the number of times the weight has previously been updated.

The decision as to whether the initial distance value $diff_i$ indicates that the feature in the query vector and feature vector are similar may be based on $w_i$: the features may be considered to be similar if $diff_i < w_i$ the feature in the query vector and feature vector are different if $diff_i > w_i$;

where $diff_i$ is the initial distance value.

The weighted distance may be a weighted Manhattan distance, which may be calculated as $$dist(I_q, I_t) = \sum_{i=1}^{n} \text{weight}_i * |diff_i|$$

where $I_q$ is the query vector, $I_t$ is the tag feature vector, and $diff_t$ is the initial distance value.

The device may be a server, or may be a user device such as a home computer, camera, or mobile phone.

In accordance with another aspect of the present invention there is provided a method of assigning a tag to a media file associated with metadata describing features of the media file. The method comprises converting the metadata into a query feature vector associated with the media file. A weighted distance is calculated between the query vector and each of a plurality of tag feature vectors, where each tag feature vector is included in a tag instance stored in a database, each tag instance further comprising a tag and a weight vector. The weighted distance is determined by comparing each feature of the query vector with the corresponding feature in the tag feature vector to obtain an initial distance value for that feature, modifying the initial distance value by a weight for that feature obtained from the weight vector in the tag instance to obtain a comparison value for that feature, and combining the comparison values of all of the features to obtain the weighted distance. The method further comprises selecting those tag instances whose tag feature vectors have the smallest weighted distance from the query vector. The user chooses one or more of the selected tags, which are then associated with the media file. The weight for each feature in the weight vectors in the tag instances selected by the tag selection unit is updated on the basis of whether or not the tag in each tag instance was chosen by the user, and the distance between the feature of the tag feature vector and the corresponding feature in the query vector.

The invention also provides a computer program comprising computer readable code which, when operated by a device, causes the device to operate as the device described above. The invention further provides a computer readable medium and a computer program as described, wherein the computer program is stored on the computer readable medium.

BRIEF DESCRIPTION OF THE DRAWINGS

Some preferred embodiments of the invention will now be described by way of example only and with reference to the accompanying drawings, in which.

DETAILED DESCRIPTION

Figure 1:
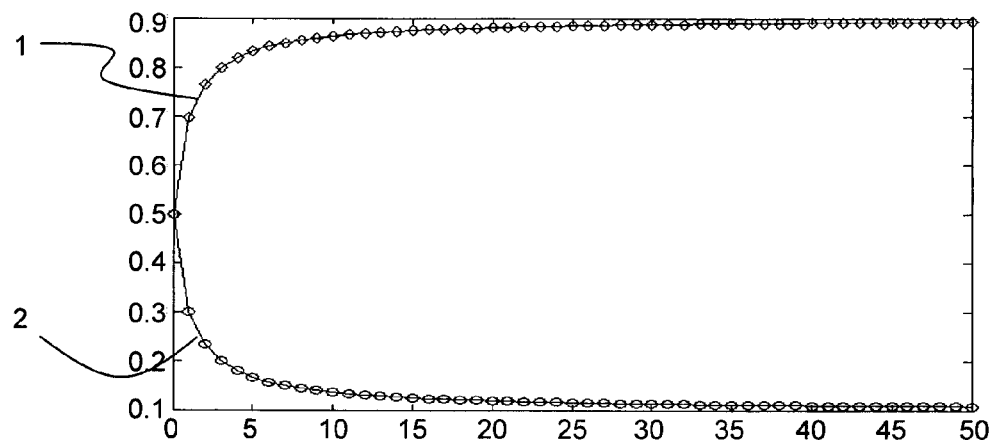
FIG. 1 illustrates the convergence of weight following user feedback.

Whenever a photograph or video is obtained, modern devices can automatically record information such as the time and location at which the image (or video) was obtained, together with additional contextual information such as the camera setting used to obtain the image and the number (and possibly even identity) of faces in the image. This information is usually saved in metadata associated with the image. The information can also be used to generate a contextual metadata feature vector, so that each image can be represented by a unique context feature vector. If the image is then tagged, this feature vector is saved in a repository associated with the tag(s) chosen by the user. Whenever a new image is produced, the context feature vector of the new image is compared with the feature vectors in the repository, and the vectors closest to that of the new image are identified. The tags associated with this vector are then suggested to the user as being potentially appropriate for the new image.

In other words, when a new photograph is obtained by a user on their mobile device, an associated "query" context feature vector is generated and sent to a server automatically. Whenever the server receives a new query vector, the system computes the distance between this vector and all the feature vectors in the database. Those similar instances with the smallest distance are returned as the suggestion tags. The user can then select and save tags from the candidate list, and the tags which are selected are uploaded to the server as user feedback. This makes it possible to apply relevance weighting to the vectors stored in the repository on the basis of user feedback so as to produce weighted feature vectors, improving the accuracy of later vector query results and thus the relevance of the tags suggested to the user. The weighted feature vector is updated dynamically according to the user's feedback.

Thus a feature vector is generated to represent each photograph obtained. Every tag applied to that photo could use the same feature vector as its representation. The feature vector comprises a list of features extracted from the contextual metadata of the photograph. An instance based learning approach, such as for example the k-nearest neighbour algorithm (KNN), is used to retrieve the most likely tags for the query photo from database. In the embodiment described below, a weighted Manhattan distance is used as a distance metric to compute the distance between the query photo representations and the feature vectors, although it will be appreciated that other distance metrics may also be employed.

The approach can be understood by considering the following example. Each incoming query photo can be represented by a feature vector which consists of 22 features including seven time-based features, twelve location-based features, two camera setting based features and one face number feature. It will be appreciated that this list of features is exemplary only, and any other vectors (such as the identity of people in the photo, possibly identified by face recognition software) may also be included.

| Type | Feature |
|---|---|
| Time-based | year, month, dayOfMonth, timeOfDay, weekOfMonth, season |
| Location-based | countryCode, altitude, samePlace, street, neighbourhood, sameArea, city, municipality, region, country, continent, global |
| Camera setting | Orientation, exposureValue |
| Face detection | faceNum |

The feature vector I is then defined by:

$$I = \begin{bmatrix} \text{year, month, } dayOfMonth, timeOfDay, dayOfWeek, weekOfMonth, \\ \text{season, } countryCode, \text{ altitude, orientation, } exposureValue, \\ faceNum, samePlace, \text{ street, neighborhood, } sameArea, \text{ city,} \\ \text{municipality, region, country, continent, global} \end{bmatrix}$$

Once the user has chosen tags to associate with this picture, the feature vector is saved in the repository together with the tags and with a weight vector, which reflects the importance of each attribute. In the repository, each feature vector is associated with a single tag, so the feature vector is saved many times over if many tags are chosen. The system will learn and store user behaviours by updating the weight according to user feedback. The weight vector is used in the calculation of distance (described below) and thus influences the final calculation result. Each feature in each feature vector saved in the repository has a corresponding weight variable in the associated weight vector.

When the feature vector and weight vector are first saved in the repository, all of the features have the same weight value and thus have equal effect in the calculation of the distance between the query instance and the saved instances. In order to reflect user preferences, when a user selects a tag associated with a weighted feature vector which is close to the query feature vector of the query photograph, the weighting for those attributes which are more important for this instance will be increased, and will therefore have more effect on future distance calculations. Conversely, for those attributes which are less important for this instance, the weighting value will be decreased, and therefore they will have less effect on future distance calculations.

$$W_t = \begin{bmatrix} w_{year}, w_{month}, w_{dayOfMonth}, w_{timeOfDay}, w_{dayOfWeek}, w_{weekOfMonth}, \\ w_{season}, w_{countryCode}, w_{altitude}, w_{orientation}, w_{expsoureValue}, w_{faceNum}, \\ w_{samePlace}, w_{street}, w_{neighborhood}, w_{sameArea}, w_{city}, w_{municipality}, \\ w_{region}, w_{country}, w_{continent}, w_{global} \end{bmatrix}$$

In this example the system uses the instance based learning method KNN to retrieve the most similar feature vectors from the database. Whenever a new photograph is obtained, a distance is calculated between the context feature vector of the new photograph (hereinafter referred to as the "query instance") and all of the saved context feature vectors (hereinafter "tag instances") in the database. The K nearest weighted tag instances, based on the value of distance, are returned.

The similarity measure method used in this example is Manhattan distance, however, because a weight vector is used to learn the user feedback, in practice a customised, weighted, Manhattan distance is used. The distance between the query photo instance and saved tag instance is calculated by summing the product of the difference between each feature in the query instance feature vector and the corresponding feature in the tag instance vector with its corresponding weight from the weight vector (with a further factor applied for relevant and irrelevant features). If the overall weighted distance is large, then it indicates the tag is irrelevant to the query photo. On the other hand, if the distance is small, then it indicates the tag is relevant to the query photo. The system returns the top K most relevant tags as candidate tags to the client.

$$dist(I_q, I_t) = \sum_{i=1}^{n} \text{weight}_i * |I_{qi} - I_{ti}| \qquad (5.1)$$

Where $I_q$ is the query instance feature vector, $I_t$ is the saved tag instance vector, n is the total number of the features in the feature vector, and $\text{weight}_i$ is a factor calculated from the ith attribute $w_i$ in the weight vector $W_t$. $|I_{qi}-I_{ti}|$ is the difference between two instances for the ith feature. To make it easy to understand, the distance can also be written more simply as:

$$dist(I_q, I_t) = \sum_{i=1}^{n} \text{weight}_i * |diff_i| \qquad (5.2)$$

The features themselves are not treated as continuous variables, but as discrete entities that can either be the same or different. This is true even of features such as date or time. The value of the difference can therefore effectively be a "flag" equal to either 0 (if a particular feature is the same in the tag vector and the query vector) or 1 accordingly. However, rather than defining differences as 0 or 1, these differences are assigned 0.1 (when the features are the same) or 0.9 (when the features are different). This is required to enables the use of weighted Manhattan distance, (weight$_i$*|diff$_i$|): the weight would not make any sense if the value of difference was 0. For example, if more than one saved tag instances were to have the exactly same value of vector as the query photo (i.e. all differences were 0), they would have the same distance from the query vector (also 0) and this could not be influenced by the weighting vector. By contrast, if the value is 0.1, the weighted distance will be affected by the weight of feature. The upper difference (where the features are different) is changed from 1 to 0.9 to achieve equivalence. Whether a feature can be said to be the same or different can also be called "relevant" or "irrelevant".

$$diff(I_{qi}, I_{ti}) = \begin{cases} 0.1 & \text{if } I_{qi} = I_{ti} \text{ relevant} \\ 0.9 & \text{if } I_{qi} \neq I_{ti} \text{ irrelevant} \end{cases} \qquad (5.3)$$

When a tag instance is first saved in the repository, 0.5 is set as the default weight value for each feature in the weight vector, which also means all features have an equal effect on distance computation. Later, the value of the weight for each feature can be updated according to user relevance feedback. And the range of value for each weight is always between 0.1 and 0.9. A large value of weight ($w_i$) indicates that a user has a high preference for this feature. A small value for $w_i$ means that the user does not care whether the feature is similar or not.

When the weight is applied in the distance calculation, a feature that is the same in the query instance and the tag instance should produce a smaller contribution to the weighted Manhattan distance if the user has a high preference for this feature than if the user has a low preference. A feature that is different in the query instance and the tag instance should produce a larger contribution to the Manhattan distance if the user has a high preference for this feature compared to when the user has a low preference.

In other words, the weight weight$_i$ actually applied to each feature will depend on whether the difference for that feature is high or low so that it has a different effect depending on whether the feature is the same ("relevant") or different ("irrelevant").

$$\text{weight}(diff_i, w_i) = \begin{cases} 1 - w_i & \text{if } diff = 0.1 \text{ relevant} \\ w_i & \text{if } diff = 0.9 \text{ irrelevant} \end{cases} \qquad (5.4)$$

The following considerations should be included when the weight is applied in the distance calculation.

First, if a tag instance $I_t$ has the same value as the query instance $I_q$ on the ith feature ($I_{qi}=I_{ti}$), then it is judged being as relevant for this specific feature. In contrast, if a tag instance $I_t$ has a different value from the query instance $I_q$ on the ith feature ($I_{qi} \neq I_{ti}$), then it is judged as being irrelevant for this specific feature. Thus, the first requirement is to ensure the distance dist($I_{qi}$,$I_{ti}$) for relevant features is always smaller than irrelevant feature.

Second, consider the situation when there are two tag instances ($I_1$, $I_2$) and both have the same value ($I_{1i}$, $I_{2i}$) as the query instance $I_q$ on the ith feature ($I_{qi}$). The two tag instances may have different weight vectors $W_1$, $W_2$. If the feature is more important for one instance (e.g. $I_2$), then, when the feature is relevant, it should get a smaller distance value than for those instances where this feature is not so important. This is called "encouragement". In order to achieve this, if the user selects that tag instance then the weighting of the relevant features in that instance should be increased for future distance calculations—because the instance satisfies the user preference.

Third, consider the situation where there are two tag instances ($I_3$, $I_4$) which both have different values ($I_{3i}$, $I_{4i}$) to the query instance $I_q$ on the ith feature ($I_{qi}$). If the feature is more important for one instance (e.g. $I_4$), then the distance value should be greater than for those instances where this feature is unimportant. This is called "punishment". If the user selects a tag instance including a feature which is irrelevant compared to the corresponding feature in the query instance, then the weighting of that feature in the tag instance should be reduced for future use because it doesn't satisfy the user preference.

In other words, if a user selects a tag instance suggested by the system as being close to a query instance, the weighting of the "relevant" features (the same in the tag instance and the query instance) is increased, but the weighting of the "irrelevant" features (different in the tag instance and query instance) is decreased.

For example, as described above, suppose instances $I_1$ and $I_2$ have the same value as the query instance $I_q$ on the ith feature, and instances $I_3$ and $I_4$ have different values from the query instance $I_q$ on the ith feature. According to formula (5.3), $I_1$, $I_2$ and $I_q$ are relevant on the ith feature, thus, the value of difference between them on the ith feature is 0.1. This can be expressed as diff($I_{qi}$, $I_{1i}$)=diff($I_{qi}$, $I_{2i}$)=0.1.

On the other hand, $I_3$, $I_4$ and $I_q$ are irrelevant on the ith feature, thus, the value of difference between them on the ith feature is 0.9. This can be expressed as diff($I_{qi}$, $I_{3i}$)=diff($I_{qi}$, $I_{4i}$)=0.9.

Suppose also that the weight $w_i$ of $I_1$, $I_2$, $I_3$, $I_4$ on the ith feature is 0.2, 0.8, 0.2, 0.8, respectively (i.e. this feature is important for $I_2$ and $I_4$ but not $I_1$ and $I_3$. Based on the formula (5.4), the weight weight$_i$ used in the distance calculation can be calculated for each instance.

|  | diff($I_{qi}$, $I_{ti}$) = 0.1 | diff($I_{qi}$, $I_{ti}$) = 0.9 |
|---|---|---|
| $I_1$ | 0.8 |  |
| $I_2$ | 0.2 |  |
| $I_3$ |  | 0.2 |
| $I_4$ |  | 0.8 |
|  | weight$_i$ = 1 − $w_i$ | weight$_i$ = $w_i$ |

Formula (5.5) indicates the way of calculating the distance between two instances on a specific feature.

$$\text{dist}(I_{qi}, I_{ti}) = \text{Weight}_i * \text{diff}(I_{qi}, I_{ti}) \quad (5.5)$$

This enables the distance between the query instance and each tag instance to be calculated on the ith feature, giving the following results:

$$\text{dist}(I_{qi}, I_{1i}) = 0.8 * 0.1 = 0.08$$

$$\text{dist}(I_{qi}, I_{2i}) = 0.2 * 0.1 = 0.02$$

$$\text{dist}(I_{qi}, I_{3i}) = 0.2 * 0.9 = 0.18$$

$$\text{dist}(I_{qi}, I_{4i}) = 0.8 * 0.9 = 0.72$$

From the result of this calculation it can be seen that $I_2$ has the smallest distance, $I_4$ has the biggest distance, and $I_1$, $I_3$ are in the second and third place. This result illustrates that the algorithm operates as expected. Firstly, dist($I_{qi}$, $I_{1i}$) and dist($I_{qi}$, $I_{2i}$) are smaller than dist($I_{qi}$, $I_{3i}$), dist($I_{qi}$, $I_{4i}$). Because it doesn't matter what the weight is, relevant features in a tag instance should always have a smaller distance value than irrelevant features.

Secondly, $I_1$ and $I_2$ have the same value as the query instance $I_q$ on the ith feature. And the weight $w_i$ of $I_1$ and $I_2$ on the ith feature is 0.2 and 0.8 respectively, which means the feature is more important for instance $I_2$ than $I_1$. Thus, when both of them have the same value, $I_2$ should have a smaller distance value than $I_1$. This is encouragement, as described above.

Furthermore, $I_3$ and $I_4$ have different values from the query instance $I_q$ on the ith feature. And the weight $w_i$ of $I_3$ and $I_4$ on the ith feature is 0.2 and 0.8 respectively, which also means the feature is more important for instance $I_4$ than $I_3$. Thus, when they are both different from $I_q$, $I_4$ should have a bigger distance value than $I_3$. This is punishment, also described above.

The discussion above illustrates how the features are weighted in the calculation of the weighted Manhattan distance, enabling the use of a weight vector to reflect the user preference. For this to work, it is also important to provide a mechanism by which the weights can be updated in response to user relevance feedback.

Two types of weight updating methods are suggested. The first one is a positive update, and the other is a negative update. One suitable formula for weight updating can be computed by using a Moving Average:

$$w_k(t+1) = \frac{w_k(t) \cdot n + 0.9}{n + 1} \quad \text{Positive update} \quad (5.6)$$

$$w_k(t+1) = \frac{w_k(t) \cdot n + 0.1}{n + 1} \quad \text{Negative update} \quad (5.7)$$

Where n is the number of times the weight has been updated. The default (initial) value is 0.5 which means that $w_k(1)$ is equal to 0.5. As shown in FIG. 1, the weight for a given feature will converge 1.2 to 0.9 or 0.1 following repeated positive or negative updates.

In practice, for any given query picture a user will be provided with a list of tags, corresponding to those tag instances having feature vectors closest to the feature vector of the query instance when calculated using weighted Manhattan distance. This list of tags can be divided into groups in one of two categories as a result of user feedback. The first group contains all the tags selected by the user, which corresponds to positive feedback for those tags. The other group of tags are discarded by the user, which corresponds to negative feedback for those tags.

The weight vector for each tag instance is updated on the basis of whether that tag has positive or negative feedback from the user. For each feature in the weight vector, it is necessary to decide whether the feature is a relevant feature. Thus, if the tag is selected by the user and the feature is a relevant feature, a positive update to that feature is carried out (for example using equation 5.6) and the value of the weight is increased. If the feature is an irrelevant feature then a negative weight update is carried applied to that feature using equation (5.7).

In order to decide if the feature is relevant feature or irrelevant, the following methods can be applied to judge it. First the difference between the query instance and the saved tag instances for this specific feature are calculated, and at the same time the value of the feature's weight in the weight vector associated with each saved tag instance is identified. These two values are compared. If the difference is smaller than the value of weight, then it is considered they are relevant on this specific feature. Otherwise, they are considered to be irrelevant.

| Relevant feature | $\text{diff}_i < w_i$ | (5.8) |
| Irrelevant feature | $\text{diff}_i > w_i$ | (5.9) |

Then a positive or negative update is applied to each feature in line with the table below:

|  | selected | Non selected |
| --- | --- | --- |
| relevant | ↑ | ↓ |
| irrelevant | ↓ | ↑ |

In addition to updating the weight vectors of tag instances in the repository, if the user adds any further tags not suggested by the system to the query photo, then the query instance is itself saved in the repository as a further tag instance for each new tag added by the user.

Thus the system described above introduces an enabler for better, more efficient, automatic media tagging systems, by sharing tags using machine learning approach. It introduces an enabler for personalizing automatic media tagging systems, i.e. what tags are preferred by a particular user given a certain photo context.

It will be appreciated that the system is described above in the context of only one user providing feedback to the repository. This provides a very personalised set of tags which is likely to match that user's preference very closely, but by necessity also reduces the number of tag instances available to choose from. It is also possible to maintain more than one database of photographs: for example a "private" database in which only feedback from one user is provided, and a "shared" database to which many users can provide feedback and in which many tag instances are saved.

Figure 2:
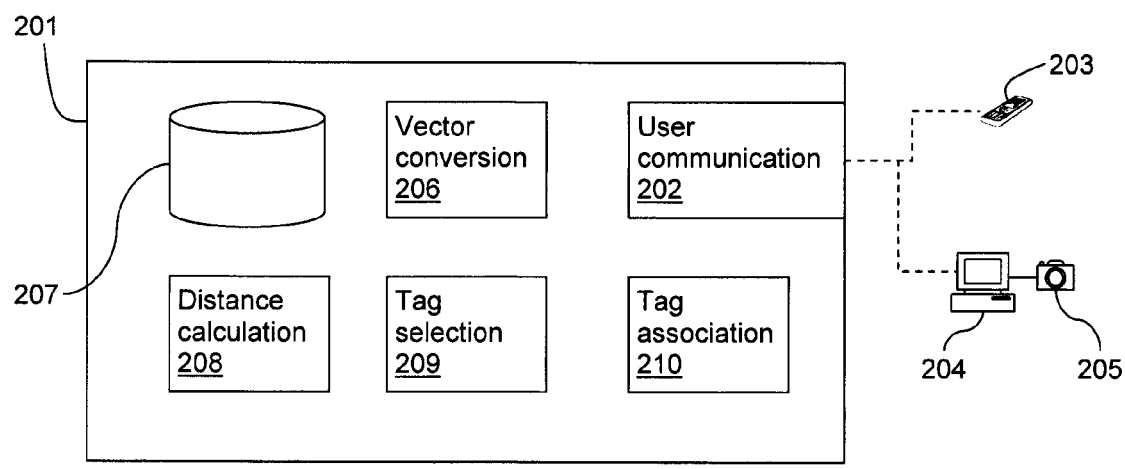
FIG. 2 is a schematic illustration of a device for suggesting tags to users and providing user feedback.

FIG. 2 is a schematic illustration of a device 201 suitable for suggesting tags to users and providing user feedback. In this example the device 201 is effectively a server which can receive metadata related to a media file, but it will be appreciated that the same functions can be carried out by a home computer or by a user device such as a camera or mobile phone, if such devices have sufficient processing power and storage capacities.

In the example shown in FIG. 2, the device 201 includes a user communication unit 202 for communicating with user devices such as a mobile phone 203 or home computer 204, itself connected to a camera 205. Such communication may take place in any suitable manner, such as via the Internet or a mobile network.

A vector conversion unit 206 converts the metadata into a query feature vector $I_q$. A database is maintained in a repository 207. The database contains a set of tag instances, each including a tag, a tag feature vector $I_t$ and a weight vector $W_t$ as described above. A distance calculation unit 208 calculates the weighted distance between the query vector $I_q$ and each tag vector $I_t$, as described above.

A tag selection unit 209 selects those tag instances having tag vectors $I_t$ closest to the query vector $I_q$ and the user communication unit 202 pushes the selected tags towards the user. In this example, the user communication unit is the communication interface between the device 201 and the user devices 202, 203, but it will be appreciated that where the device is itself a user device, the user communication unit may be include a screen and/or keyboard enabling direct communication with the user.

Once the user has chosen one or more tags, a tag association unit 210 associates the chosen tags with the media file. A weight updating unit 211 updates the weight of each feature $w_i$ in each weight vector $W_t$ as described above.

Figure 3:
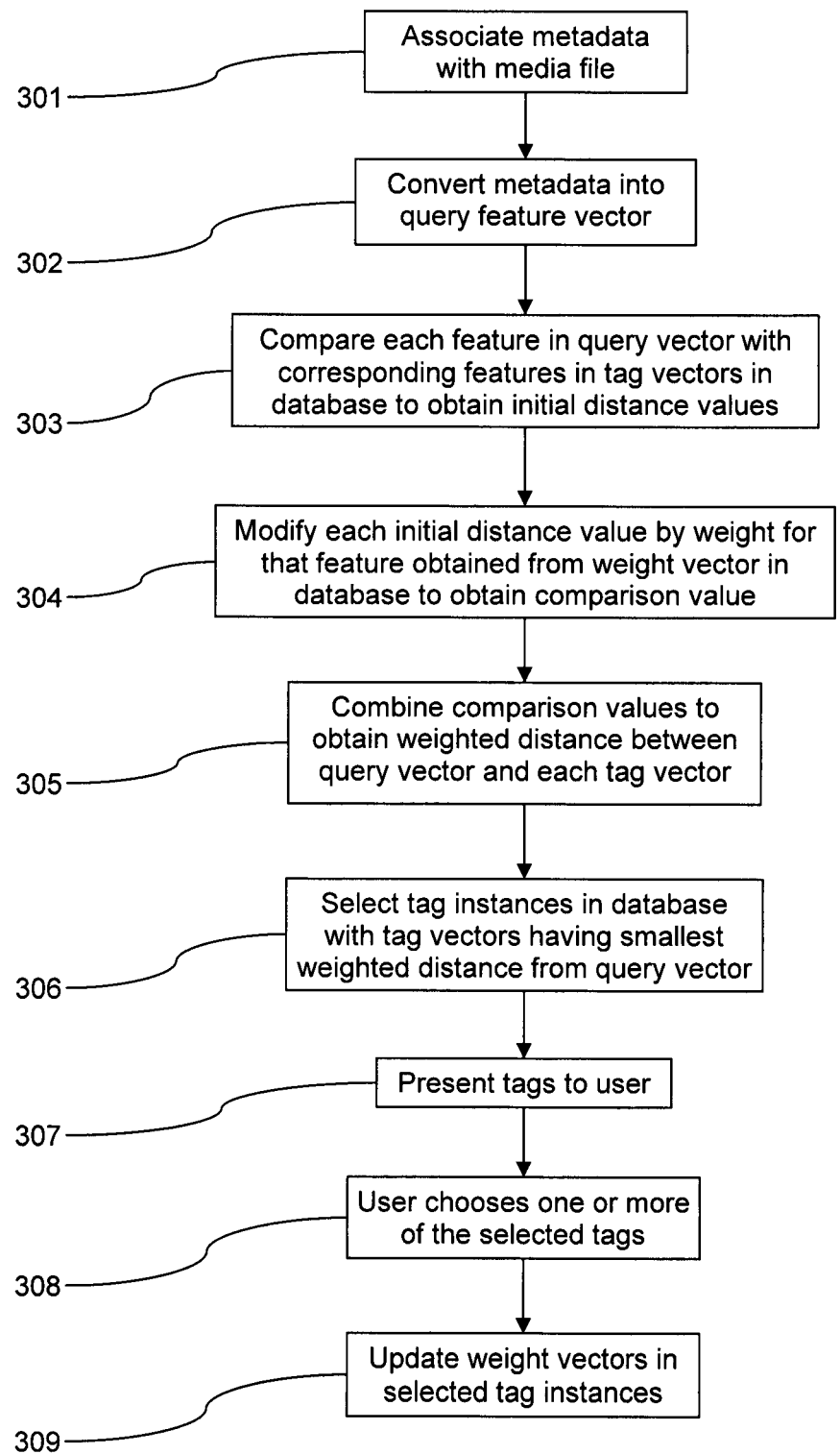
FIG. 3 is a flowchart illustrating the steps carried out in suggesting tags and providing user feedback.

FIG. 3 is a flowchart illustrating the steps carried out in suggesting tags and providing user feedback:

301. Metadata is associated with a media file such as a photograph. This is usually carried out in the camera that obtains the photograph.
302. The metadata is converted into a query feature vector $I_q$.
303. Each feature in the query vector is compared with corresponding features $I_{ti}$ in tag feature vectors $I_t$ in the database to obtain an initial distance value (one value per feature per tag vector).
304. The initial distance values are modified on the basis of the weight $w_i$ of the corresponding features $w_i$ in the weight vector $W_t$ associated with each tag vector $I_t$. This provides a comparison value per feature per tag vector.
305. The comparison values are combined to generate a weighted distance (e.g. weighted Manhattan distance) between the query vector and each tag vector.
306. A number of tag instance in the database are selected—i.e. those tag instances having tag vectors with the smallest weighted distance to the query vector.
307. The tags from the selected tag instances are presented to the user.
308. The user chooses one or more of the selected tags.
309. The weight vectors $W_t$ from the selected tag instances are updated. As described above, each feature is updated individually on the basis of whether or not a particular tag was chosen by the user, and whether or not that feature was relevant or irrelevant to the corresponding feature in the query vector.

It will be appreciated that variations from the above described embodiments may still fall within the scope of the invention. For example, the system has been described as measuring a weighted Manhattan distance between feature vectors, but any approach which enables the isolation of individual features' contribution to a distance calculation may also be used. Furthermore, although the system has been described generally with reference to photographs and images, it will be appreciated that it can be applied equally well to other media files.

The invention claimed is:

1. A user device for assigning a tag to a media file associated with metadata describing features of the media file, the user device comprising:
 a vector conversion unit for converting the metadata into a query feature vector associated with the media file;
 a database containing tag instances, each tag instance comprising a tag, a tag feature vector and a weight vector;
 a distance calculation unit for calculating a weighted distance between the query vector and the tag feature vector of each tag instance in the database, the weighted distance being determined by:
  comparing each feature of the query vector with the corresponding feature in the tag feature vector to obtain an initial distance value for that feature;
  modifying the initial distance value by a weight for that feature obtained from the weight vector in the tag instance to obtain a comparison value for that feature; and
  combining the comparison values of all of the features to obtain the weighted distance;

a tag selection unit for selecting the tag instances whose tag feature vectors have the smallest weighted distance from the query vector;

a user communication unit for enabling the tags from the selected tag instances to be presented to a user so that the user can choose one or more tags from those presented to him;

a tag association unit for associating the chosen tags with the media file;

a weight updating unit for updating the weight for each feature in the weight vectors in each tag instance selected by the tag selection unit on the basis of:

whether or not the tag in each tag instance was chosen by the user, and the distance between the feature of the tag feature vector and the corresponding feature in the query vector.

2. The user device of claim 1, wherein:

the weight updating unit is configured to improve the weight of a feature in the weight vector of a tag instance if:

that tag instance was chosen by the user and the initial distance value indicates that the feature in the query vector and feature vector are similar; or that tag instance was not chosen by the user and the initial distance value indicates that the feature in the query vector and feature vector are different;

and the weight updating unit is configured to degrade the weight of a feature in the weight vector of a tag instance if:

that tag instance was chosen by the user and the initial distance value indicates that the feature in the query vector and feature vector are different; or that tag instance was not chosen by the user and the initial distance value indicates that the feature in the query vector and feature vector are similar.

3. The user device of claim 2, wherein the weight of a feature in a weight vector of a tag instance is higher if user feedback has indicated that the feature is relevant for that tag than if user feedback has indicated that the feature is irrelevant for that tag, and wherein improving the weight comprises increasing the weight, and degrading the weight comprises decreasing the weight.

4. The user device of claim 3, wherein increasing and decreasing the weight is carried out using a moving average.

5. The user device of claim 2, wherein the distance calculation unit is configured so that obtaining the initial distance value for each feature is achieved by assigning to the initial distance value a fraction of 1, wherein the fraction of 1 corresponds to a first value if the feature is the same in the query vector and the tag feature vector, and corresponds to a second value if the feature is different in the two vectors, and further wherein the first value is smaller than the second value.

6. The user device of claim 5, wherein:

the weight vector in each tag instance comprises a set of weight values $w_i$ each corresponding to a feature i in the tag weight vector;

the distance calculation unit is configured to obtain the weight by which the initial distance value for each feature is to be modified on the basis that:

weight=$w_i$ if the initial distance value corresponds to the first value; and weight=$1-w_i$ if the initial distance value corresponds to the second value.

7. The user device of claim 6, wherein the weight updating unit is configured to improve a weight $w_k$ using the formula $w_k(t+1)=(w_k(t) \cdot n+0.9)/(n+1)$ and degrade a weight using the formula $w_k(t+1)=(w_k(t) \cdot n+0.1)/(n+1)$ where n is the number of times the weight has previously been updated.

8. The user device of claim 6, wherein the initial distance value indicates that:

the feature in the query vector and feature vector are similar if $diff_i < w_i$; and the feature in the query vector and feature vector are different if $diff_i > w_i$;

where $diff_i$ is the initial distance value.

9. The user device of claim 1, wherein the weighted distance is a weighted Manhattan distance calculated as $$dist(I_q, I_t) = \sum_{i=1}^{n} \text{weight}_i * |diff_i|$$

where $I_q$ is the query vector, $I_t$ is the tag feature vector, and $diff_i$ is the initial distance value.

10. The user device of claim 1, wherein the user communication unit comprises a transceiver for communicating with a user device, the user device configured to present the tags to the user and record the choices made by the user.

11. The user device of claim 1, wherein the media file is a picture file.

12. A method of assigning a tag to a media file associated with metadata describing features of the media file, the method comprising:

converting the metadata into a query feature vector associated with the media file;

calculating a weighted distance between the query vector and each of a plurality of tag feature vectors, each tag feature vector being included in a tag instance stored in a database, each tag instance further comprising a tag and a weight vector, the weighted distance being determined by:

comparing each feature of the query vector with the corresponding feature in the tag feature vector to obtain an initial distance value for that feature;

modifying the initial distance value by a weight for that feature obtained from the weight vector in the tag instance to obtain a comparison value for that feature; and combining the comparison values of all of the features to obtain the weighted distance;

selecting the tag instances whose tag feature vectors have the smallest weighted distance from the query vector;

determining which ones of the selected tags are chosen by a user as chosen tags;

associating the chosen tags with the media file;

updating the weight for each feature in the weight vectors in the selected tag instances on the basis of whether or not the tag in each tag instance was chosen by the user, and the distance between the feature of the tag feature vector and the corresponding feature in the query vector.

13. The method of claim 12, wherein the step of updating the weight for each feature in the weight vectors in the selected tag instances includes improving the weight of a feature if:

that tag instance was chosen by the user and the initial distance value indicates that the feature in the query vector and feature vector are similar; or that tag instance was not chosen by the user and the initial distance value indicates that the feature in the query vector and feature vector are different;

and degrading the weight of a feature if:

that tag instance was chosen by the user and the initial distance value indicates that the feature in the query vector and feature vector are different; or that tag instance was not chosen by the user and the initial distance value indicates that the feature in the query vector and feature vector are similar.

14. The method of claim 13, wherein the weight of a feature in a weight vector of a tag instance is higher if user feedback has indicated that the feature is relevant for that tag than if user feedback has indicated that the feature is irrelevant for that tag, and wherein improving the weight comprises increasing the weight, and degrading the weight comprises decreasing the weight.

15. The method of claim 13, wherein the initial distance value for each feature is obtained by assigning to the initial distance value a fraction of 1, wherein the fraction of 1 corresponds to a first value if the feature is the same in the query vector and the tag feature vector, and corresponds to a second value if the feature is different in the two vectors, and further wherein the first value is smaller than the second value.

16. The method of claim 15, wherein:

the weight vector in each tag instance comprises a set of weight values $w_i$ each corresponding to a feature i in the tag weight vector;

the weight by which the initial distance value for each feature is to be modified is obtained on the basis that:

weight=$w_i$ if the initial distance value corresponds to the first value; and weight=$1-w_i$ if the initial distance value corresponds to the second value.

17. The method of claim 16, wherein a weight $w_k$ is improved using the formula $w_k(t+1)=(w_k(t) \cdot n+0.9)/(n+1)$ or degraded using the formula $w_k(t+1)=(w_k(t) \cdot n+0.1)/(n+1)$ where n is the number of times the weight has previously been updated.

18. A non-transitory computer-readable medium storing a computer program, comprising computer readable code which, when operated by a device, causes the device to assign a media tag to a media file associated with metadata describing features of the media file, based on causing the device to:

convert the metadata into a query feature vector associated with the media file;

calculate a weighted distance between the query vector and the tag feature vector of each tag instance in a database, wherein the database contains tag instances, each tag instance comprising a tag, a tag feature vector and a weight vector, and wherein the computer readable code causes the device to:

compare each feature of the query vector with the corresponding feature in the tag feature vector to obtain an initial distance value for that feature;

modify the initial distance value by a weight for that feature obtained from the weight vector in the tag instance to obtain a comparison value for that feature; and combine the comparison values of all of the features to obtain the weighted distance;

select the tag instances whose tag feature vectors have the smallest weighted distance from the query vector;

present the selected tag instances to a user, so that the user can choose one or more tags from those presented to him;

associate the chosen tags with the media file; and update the weight for each feature in the weight vectors in each selected tag instance on the basis of:

whether or not the tag in each tag instance was chosen by the user, and the distance between the feature of the tag feature vector and the corresponding feature in the query vector.

* * * * *